3,468,776
PHOTOSENSITIZED OXYGENATION PROCESS FOR PREPARING 20-KETOSTEROIDS FROM CORRESPONDING 22-ENAMINES

Joel E. Huber, Kalamazoo, Mich., assignor to The Upjohn Company, Kalamazoo, Mich., a corporation of Delaware
No Drawing. Filed June 16, 1967, Ser. No. 646,471
Int. Cl. B01j 1/10
U.S. Cl. 204—158      6 Claims

ABSTRACT OF THE DISCLOSURE

This invention relates to a single-step process for the direct conversion, by photosensitized oxygenation, of steroid 22-enamines, i.e., steroid 20-(22)-ene-22-amines of the formula

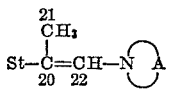

I to the corresponding 20-ketosteroids of the formula

II wherein St-represents a 10,13,dimethyl cyclopentanoperhydrophenanthrene nucleus and

represents a secondary amine radical in which A represents the atoms necessary to complete two alkyl, hydroxyalkyl or aralkyl radicals or a heterocyclic ring system.

BRIEF SUMMARY OF THE INVENTION

A compresensive review of syntheses employing photosensitized oxygenation, containing numerous references, by Schenck and his co-workers appears in Agnew. Chem. 69, 579.

In carrying out the photosensitized oxygenation of the 22-enamine compounds of Formula I, photosensitizers disclosed in the Schenck article, such as hematoporphyrin, protoporphyrin, eosin Y, methylene blue, chlorophyll, hypericin, erythrocin B, chlorin $E_6$, riboflavin, and rose bengal, have been found satisfactory. Advantageously, the light employed is a conventional fluorescent lamp surrounded by a glass jacket containing the steroid solution. Such an arrangement can be modified and adapted to provide a continuous flow process for large scale conversions; e.g., in vessels of large volume, irradiation can be accomplished by inserting the fluorescent lamp into glass wells or positioning them against glass ports. However, the process of the invention is not limited to the use of this particular light source. Thus, any light source producing radiation in the region of maximum absorption of the photosensitizer can be used. Sun light can also be used for this purpose, as well as incandescent lamps and carbon arc lights.

The preferred solvents are acetone, pyridine, methylene chloride, ethyl acetate, and dimethylformamide. Inert solvents such as benzene and ethanol can also be used.

The optimum temperature for the photosensitized oxygenation of the starting steroid 22-enamines (1) was found to be between about 0° C. to about 40° C., but temperatures between about −100° C. and about 80° C. are also satisfactory.

The time required for conversion of the compounds of Formula I to the corresponding 20-ketones (II) by the photosensitized oxygenation reaction depends on such factors as, light intensity, the rate of oxygen bubbling through the reaction mixture, the amount of photosensitizer present and the amount of substrate (I). Oxygen is usually bubbled through the reaction mixture throughout the course of the conversion; air can also be used. Pressure vessels charged with oxygen and illuminated either from within or through glass ports can also be used. The progress of the reaction is followed by taking aliquots for thin-layer chromatography and terminating the reaction when the starting material (I) is converted to the 20-ketone (II).

All of the compounds embraced by Formula II can be isolated from their reaction mixtures by conventional means, for example, when a water-miscible solvent is used, by pouring the reaction mixture into water and separating the resulting precipitate by filtration or by extraction with water-immiscible solvents. Additional purification of the product can be accomplished by conventional means, for example, by elution chromatography from an adsorbent column with a suitable solvent such as acetone, methanol, dilute methanol, ethanol, ether, methylene chloride and Skellysolve B (hexanes), mixtures and combinations of these solvents; also by gradient elution chromatography from an adsorbent column with a suitable mixture of solvents, such as methylene chloride-Skellysolve B, acetone-Skellysolve B, and the like.

The steroid 22-enamines (I) employed as starting materials in the process of the present invention are prepared in accordance with the procedures described in J. Amer. Chem Soc. 85, 207 and U.S. Patent 2,752,337, namely, by the reaction of a corresponding steroid 22-aldehyde with a secondary amine. The 22-aldehydes are prepared in the manner set forth in J. Amer. Chem. Soc. 80, 915, 69, 1957 and 70, 2953. Representative steroid 22-aldehydes which can be converted to their corresponding 22-amines (I) include bisnorcholan-22-al, 3β-acetoxybisnorcholan-22-al, 3β-benzoxybisnorcholan-22-al, 3β - alphanapthoxybisnorcholan-22-al, 3β-methoxybisnorcholan-22-al, 3β-benzyloxybisnorcholan - 22 - al, 3β-hydroxybisnorcholan-22-al, 3-ketobisnorcholan-22-al, 3β-acetoxybisnor-5-cholen-22-al, 3β-n-butyroxybisnor-5-cholen-22-al, 3β-phenylacetoxybisnor-5-cholen-22-al, 3β-isopropyloxybisnor-5-cholen-22-al, 3β-hydroxybisnor-5-cholen-22-al and the i steroids thereof, 3-ketobisnor-4-cholen-22-al, the maleic anhydride, maleimide, and maleic ester adducts of bisnor-5,7-choladien-22-al, 3β-acetoxybisnor-5,7-choladien-22-al, 3β-benzoxybisnor-5,7-choladien-22-al, 3β-ethoxybisnor-5,7-choladien-22-al, 3β-triphenylmethoxybisnor-5,7-choladien-22-al, 3β-hydroxybisnor-5,7-choladien-22-al, 3-ketobisnor-5,7-choladien-22-al, bisnor-5,7,9-cholatrien-22-al, 3β-propionoxybisnor-5,7,9-cholatrien - 22 - al, 3β-benzyloxybisnor-5,7,9-cholatrien-22-al, 3β-hydroxybisnor-5,7,9-cholatrien-22-al, 3-ketobisnor-5,7,9-cholatrien-22-al, 3β-acetoxy-9,11-oxidobisnor-5,7-choladien-22-al, 3β-n-hexyloxy-9,11-oxidobisnor-5,7-choladien - 22 - al, 3β - hydroxy-9,11-oxidobisnor-5,7-choladien-22-al, 3-keto-9,11-oxidobisnor-5,7-choladien-22-al, and the like. The foregoing and similar steroid 22-aldehydes which can be reacted with secondary amines can be prepared by methods heretofore described in the art. The preparation of the 3β-hydroxy, 3β-acetoxy, 3β-methoxy, 3β-benzyloxy and the i-methyl ether bisnor-5-cholen-22-als are described in J. Amer. Chem. Soc. 69, 1957 and 70, 2953. 3-keto-bisnor-4-cholen-22-al and a method for its preparation is described in J. Amer. Chem. Soc. 80, 915. The maleic anhydride adducts of 3β-acetoxybisnor-5-7-choladien-22-al and 3β-acetoxy-9,11-oxidobisnor-5,7-choladiene-22-al and methods for their preparation are described in J. Org. Chem. 13, 10–20 and adducts of 3-ketobisnor-5,7,9-(11)-cholatrien-22-al and methods for their preparation are described in U.S. Patent 2,530,389.

Additional steroid 22-aldehydes, e.g., 3β,5α-dioxygenated-11-keto-9β-bisnorcholan-22-als and their corresponding 9β,11β-epoxides, can be prepared in the manner disclosed in U.S. Patent 2,897,213. Numerous 22-aldehydes can be prepared from the compounds embraced by the generic formula designated (a) in column 4 of U.S. Patent 3,281,415 by employing the procedures of Example IV of U.S. Patent 3,022,324; in those compounds of Formula (A) wherein Y is >C=O, the procedure of Example IV is modified by first forming a 3-ketal protective group and, following the formation of the 22-al radical, restoring the 3-keto function by acid hydrolysis of the 3-ketal.

Representative secondary amines which can be employed in the preparation of steroid enamines (I) from corresponding steroid 22-aldehydes include dialkylamines such as diethylamine, dibutylamine, dioctylamine, and didodecylamine; cycloalkylamines such as dicyclohexylamine and the like, cyclic amines such as piperidine, pyrrolidine, tetrahydroquinoline, oxazolidine (tetrahydrooxazole), morpholine and the like; aralkylalkyl amines such as N-methylbenzylamine, dibenzylamine and the like; substituted dialkylamines such as diethanolamine and the like; and arylalkylamines such as N-methylaniline, N-methyltoluidine, N-methylanisidine, and the like. However, it is preferred, for convenience and economy, to use secondary amines whose molecular weights are between approximately 70 and approximately 150, such as pyrrolidine, piperidine, morpholine and diethylamine.

The compounds prepared by the process of this invention embraced by Formula II possesses valuable pharmacological properties, particularly (1) anti-inflammatory and (2) progestational activities. These properties render them useful in (1) the treatment of various inflammatory conditions of the skin, eyes, respiratory tract, bones and internal organs due to viral or bacterial infections, contact dermatitis, allergic reactions and rheumatoid arthritis, and in (2) the maintenance of pregnancy. The compounds of the aforesaid formula are also useful as intermediates in the preparation of a wide variety of physiologically highly active and therapeutically valuable (1) anti-inflammatory and (2) progestational compounds.

DETAILED DESCRIPTION

It is to be understood that the invention is not to be limited to the exact details of operation or exact compositions shown and described herein, as obvious modifications and equivalents will be apparent to one skilled in the art, and the invention is therefore to be limited only by the scope of the appended claims.

PREPARATION 1

22-(N-morpholinyl)-bisnor-4,20(22)-choladien-3-one (I)

A mixture of 6.57 g. of barium oxide, 6.57 g. of 3-ketobisnor-4-cholen-22-al (prepared as described in J. Amer. Chem. Soc. 72, 2617), 1.92 ml. of morpholine and 100 ml. of benzene was stirred for about 10 minutes at room temperature in an atmosphere of nitrogen and then heated under reflux for about 2.75 hours with continued stirring. The mixture was then cooled, filtered and the filter cake washed with about 15 ml. of benzene. The organic filtrates were then combined and the solvents removed by distillation at reduced pressure to give 8.19 g. of crude material, which on trituration with about 24 ml. of cold acetone yielded 6.66 g. of 22-(N-morpholinyl)-bisnor-4,20(22)-choladien-3-one (I), melting at 155 to 160° C.

*Analysis.*—Calc'd for $C_{26}H_{39}O_2N$: C, 78.7; H, 9.89; N, 3.52. Found: C, 79.0; H, 9.70; N, 3.58.

PREPARATION 2

22-(N-piperidinyl)-bisnor-4,20(22)-choladien-3-one (I)

To a solution of 41 g. of 3-ketobisnor-4-cholen-22-al (prepared as described in J. Amer. Chem. Soc. 74, 3627) in 600 ml. of benzene, 15 ml. of piperidine was added and the mixture heated at brisk reflux under an atmosphere of nitrogen using a moisture trap to collect the water of reaction. After about 3 hours the calculated amount of water had collected in the trap; the reaction mixture was taken to dryness in vacuo on a hot water-bath and the residue placed in a dessicator under reduced pressure over phosphrous pentoxide for about 72 hours. The residue was thoroughly agitated with about 150 ml. of methanol, the methanolic extract cooled to about 4° C. for about 3.5 hours, filtered, and the filter cake washed with about 10 ml. of cold methanol and dried to obtain an 86% yield of 22-(N-piperidinyl)-bisnor-4,20(22)-choladien - 3 - one (I) melting at 128 to 133° C. (dec); $[\alpha]_D^{25}$ +90°.

*Analysis.*—Calc'd for $C_{27}H_{41}ON$: C, 81.98; H, 10.45; N, 3.54. Found: C, 81.92; H, 10.45; N, 3.52.

The following 22-enamines can be prepared in manners essentially as described in Preparations 1 and 2:

(1) 22-diethylaminobisnor-20(22)-cholene (I) by heating bisnorcholan-22-al with a slight excess of diethylamine, (2) 3β-acetoxy-22 - di-n-butylaminobisnor - 20(22)-cholene (I) by heating 3β-acetoxybisnorcholan-22-al with a slight excess of di-n-butylamine, (3) 3β-benzoxy-22-dioctylaminobisnor-20(22)-cholene (I) by heating 3β-benzoxybisnorcholan-22-al with a slight excess of dioctylamine, (4) 3β-alpha - naphthoxy-22-didodecylaminobisnor-20 (22)-cholene (I) by heating 3β-alpha-naphthoxybisnorcholan-22-al with a slight excess of didodecylamine, (5) 3β - methoxy-22-dicyclohexylaminobisnor-20(22)-cholene (I) by heating 3β-methoxybisnorcholan-22-al with a slight excess of dicyclohexylamine, (6) 3β - benzyloxy-22-piperidinobisnor-20(22)-cholene (I) by heating 3β-benzyloxybisnorcholan-22-al with a slight excess of piperidine, (7) 3β - hydroxy - 22-pyrrolidinobisnor-20(22)-cholene (I) by heating 3β-hydroxybisnorcholan-22-al with a slight excess of pyrrolidine, (8) 3 - keto-22-tetrahydroquinolinobisnor-20(22)-cholene (I) by heating 3-ketobisnorcholan-22-al with a slight excess of tetrahydroquinoline, (9) 3β - n - butyroxy - 22 - oxazolidinobisnor - 5,20-(22) - choladiene(I) by heating 3β - n - butyroxybisnor-5-cholen - 22 - yr - al with a slight excess of oxadine,

(10) 3β - phenylacetoxy - 22 - morpholinobisnor - 5-20(22) - choladiene (I) by heating 3β - phenylacetoxybisnor-5-cholen-22-al with a slight excess of morpholine,

(11) 3β - isopropyloxy - 22 - N - methylbenzylaminobisnor-5,20(22)-choladiene (I) by heating 3β-isopropyloxybisnor-5-cholen-22-al with a slight excess of N-methylbenzylamine,

(12) The dimethyl maleate adduct of 22-dibenzylaminobisnor-5,7,20(22)-cholatriene (I) by heating the dimethyl maleate adduct of bisnor-5,7-choladien-22-al with a slight excess of dibenzylamine,

(13) The maleic anhydride, adduct of 3β-acetoxy-22-diethanolaminobisnor-5,7,20(22)-cholatriene (I) by heating the maleic anhydride adduct of 3β-acetoxybisnor-5,7-choladien-22-al with a slight excess of diethanolamine,

(14) The diethyl maleate adduct of 3β-benzoxy-22-(2-methyl-pyrrolidino)-bisnor-5,7,20(22)-cholatriene (I) by heating the diethyl maleate adduct of 3β-benzoxybisnor-5,7-choladien-22-al with a slight excess of 2-methylpyrolidine,

(15) The di-n-butyl maleate adduct of 3β-ethoxy-22-(2-methylpiperidino)-bisnor-5,7,20(22)-cholatriene (I) by heating the di-n-butyl maleate adduct of 3β-ethoxybisnor-5,7-choladien-22-al with a slight excess of 2-methylpiperidine,

(16) the dibenzyl maleate adduct of 3β-triphenylmethoxy - 22 - (3 - methylpiperidino) - bisnor - 5,7,20(22)-cholatriene (I) by heating 3β-triphenylmethoxybisnor-5,7-choladien-22-al with a slight excess of 3-methylpiperidine,

(17) The maleimide adduct of 3β-hydroxy-22-oxazolidinobisnor-5,7,20(22)-cholatriene (I) by heating the maleimide adduct of 3β-hydroxybisnor-5,7-choladien-22-al with a slight excess of oxazolidine,

(18) The maleic anhydride adduct of 3-keto-22-morpholinobisnor-5,7,20(22)-cholatriene (I) by heating the maleic anhydride adduct of 3-ketobisnor-5,7-choladien-22-al with a slight excess of morpholine,

(19) The dimethyl maleate adduct of 3β-propionoxy-22-piperidinobisnor-5,7,9,20(22)-cholatetraene (I) by heating the dimethyl maleate adduct of 3β-propionoxy-bisnor-5,7,9-cholatrien-22-al with a slight excess of piperidine,

(20) The maleic anhydride adduct of 3-keto-22-(2-methylpyrrolidino)-bisnor-5,7,9,20(22)-cholatetraene (I) by heating the maleic anhydride adduct of 3-ketobisnor-5,7,9-cholatrien-22-al with a slight excess of 2-methylpyrrolidine,

(21) The dimethyl maleate adduct of 3β-acetoxy-9,11-oxido - 22 - N - methylanilinobisnor - 5,7,20(22) - cholatriene (I) by heating the dimethyl maleate adduct of 3β - acetoxy - 9,11 - oxidobisnor - 5,7 - choladien - 22 - al with a slight excess of N-methylaniline,

(22) 3β - hydroxy - 22 - N - methylanisidinobisnor-5,7,9,20(22)-cholatetraene (I) by heating 3-hydroxybisnor - 5,7,9,20(22) - cholatetraene (I) by heating 3β-hydroxybisnor-5,7,9-cholatrien-22-al with a slight excess of N-methylanisidine,

(23) The dimethyl maleate adduct of 3β,12β-diacetoxy-22 - morpholinobisnor - 5,7,9,20(22) - cholatetraene (I) by heating the dimethyl maleate adduct of 3β-12β-diacetoxybisnor-5,7,9-cholatrien-22-al with a slight excess of morpholine,

(24) 22 - (N - morpholinyl) - 3β,5α - dihydroxy - 11-keto-9β-bisnor-20(22)-cholen (I) by heating 3β,5α-dihydroxy - 11 - keto - 9β - bisnor - cholan - 22 - al with a slight excess of morpholine,

(25) 22 - (N - piperidinyl) - 3β - acetoxy - 5α - hydroxy - 9β,11β - oxido - bisnor - 20(22) - cholen (I) by heating 3β - acetoxy - 5α - hydroxy - 9β,11β - oxidobisnorcholan - 22 - al with a slight excess of piperidine,

(26) - (N - dibenzylaminyl) - 3 - ketobisnor - 1,4,-20(22)-cholatriene (I) by heating 3-ketobisnor-1,4-choladien-22-al with a slight excess of dibenzylamine,

(27) 22 - (N - morpholinyl) - 3 - ketobisnor - 4,6, 20-(22)-cholatriene (I) by heating 3-ketobisnor-4,6-choladien-22-al with a slight excess of morpholine,

(28) 22 - (N - diethylaminyl) - 3 - ketobisnor - 4,7-20(22) - cholatriene (I) by heating 3 - ketobisnor - 4,7-choladien-22-al with a slight excess of diethylamine,

(29) 22 - (N - pyrrolidinyl) - 3 - ketobisnor - 2α-methyl - 4,20(22) - choladiene (I) by heating 3-ketobisnor - 2α - methyl - 4 - choladen - 22 - al with a slight excess of pyrrolidine,

(30) 22 - (N - 2 - methylpyrrolidinyl) - 3 - ketobisnor-6α - methyl - 1,4,20(22) - cholatriene (I) by heating 3 - ketobisnor - 6α - methyl - 1,4 - choladien - 22 - al with a slight excess of 2-methylpyrrolidine,

(31) 22 - (N - methylanilinyl) - 3 - ketobisnor - 7α-methyl - 4,20(22) - choladiene (I) by heating 3 - ketobisnor - 7α - methyl - 4 - cholen - 22 - al with a slight excess of methylaniline,

(32) 22 - (N - anisidinyl) - 3β,11α - dihydroxy - bisnor - 20(22) - cholene (I) by heating 3β,11α - dihydroxy - bisnorcholan - 22 - al with a slight excess of anisidine,

(33) 22 - (N - tetrahydroquinolinyl) - 3 - ethylenedioxy - 6α - fluoro - 11β - hydroxy - bisnor - 20(22) - cholene (I) by heating 3 - ethylenedioxy - 6α - fluoro - 11β-hydroxy-bisnorcholan-22-al with a slight excess of tetrahydroquinoline,

(34) 22 - (N - morpholinyl) - 3 - ethylenedioxy - 5α-hydroxy - 6β - fluoro - 11 - keto - bisnor - 20(22) - cholene (I) by heating 3-ethylene-dioxy-5α-hydroxy-6β-fluoro-11-keto-bisnorcholan-22-al with a slight excess of morpholine,

(35) 22 - (N - dioctylaminyl) - 3 - ketobisnor - 9α-fluoro - 11β - hydroxy - 4,20(22) - choladiene (I) by heating 3 - ketobisnor - 9α - fluoro - 11β - hydroxy - 4-cholen - 22 - al with a slight excess of dioctylamine,

(36) 22 - (N - piperidinyl) - 3 - ketobisnor - 6α,9α-difluoro - 11β - hydroxy - 6α - methyl - 1,4,20(22) - cholatriene (I) by heating 3 - ketobisnor - 6α,9α - difluoro-11β - hydroxy - 6α - methyl - 1,4 - choladiene with a slight excess of piperidine,

(37) 22 - (N - dicyclohexylaminyl) - 3 - ketobisnor-6α - methyl - 11β - hydroxy - 4,20(22) - choladiene (I) by heating 3 - ketobisnor - 6α - methyl - 11β - hydroxy-4 - cholen - 22 - al with a slight excess of dicyclohexylamine.

(38) 22 - (N - morpholinyl) - 3 - ketobisnor - 9α,11β-dichloro - 4,6,20(22) - cholatriene (I) by heating 3-ketobisnor - 9α, 11β - dichloro - 4,6 - choladien - 22 - al with a slight excess of morpholine,

(39) 22 - (N - piperidinyl) - 3 - ketobisnor - 11β - hydroxy - 1,4,6,20(22) - cholatetraene (I) by heating 3-ketobisnor - 11β - hydroxy - 1,4,6 - cholatrien - 22 - al with a slight excess of piperidine, and

(40) 22 - (N - morpholinyl) - 3 - ketobisnor - 6α-methyl - 9α - cholo - 11β - hydroxy - 1,4,20(22) - cholatriene (I) by heating 3 - ketobisnor - 6α - methyl - 9α-chloro - 11β - hydroxy - 1,4 - choladien - 22 - al with a slight excess of morpholine.

EXAMPLE 1

*Preparation of 4-pregnene-3,20-dione (II) by the photosensitized oxygenation of 22-(N-morpholinyl)bisnor-4,20(22)-choladien-3- one (I)*

A slurry of 5 g. (12.6 mmoles) of 22-(N-morpholinyl)-bisnor-4,20(22)-choladien-3-one (I), 20 mg. of rose bengal dye and 25 ml. of dimethylformide were placed in a 2.5 cm. x 56 cm. glass tube fitted with a medium porosity fritted disk at the bottom and a cold finger mounted at the top which extended through the center of the tube to the fritted disk. Oxygen was passed through the disk at a rate of 0.25 cu. ft./hour while the tube was illuminated with four 15 watt fluorescent lamps. This temperature was maintained at about 15° C. throughout the reaction period of about 17.5 hours. The reaction mixture was then drained from the tube and about 125 g. of crushed ice was added portionwise with stirring over a period of about 1 hour. This mixture was stored at about 0° C. for about 4 hours and then the solids therein collected by filtration, washed with water and dried under vacuum to constant weight to afford a quantitative yield (3.96 g.) of 4-pregnene-3,20-dione, also known as progesterone (II), melting at 126 to 128° C., $[\alpha]_D+175.6°$ (dioxane).

In a manner essentially as described in Example 1, the following 20-ketosteroids (II) can be prepared by the photosensitized oxygenation of the corresponding 22-enamines (I), as follows:

(1) pregnan - 20 - one (II) from 22 - diethylaminobisnor - 20(22) - cholene (I), (2) 3β - acetoxy - pregnan - 20 - one (II) from 3β-acetoxy - 22 - di - n - butylaminobisnor - 20(22) - cholene (I), (3) 3β - methoxy - pregnan - 20 - one (II) from 3β-methoxy - 22 - dicyclohexylaminobisnor - 20(22) - cholene (I), (4) 3α - hydroxy - pregnan - 20 - one (II) from 3α-hydroxy - 22 - pyrrolidinobisnor - 20(22) - cholene (I), (5) pregnan - 3,20 - dione (II) from 3 - keto - 22-tetrahydro - quinolinobisnor - 20(22) - cholene (I), (6) 3β - butyroxy - 5 - pregnen - 20 - one (II) from 3β - butyroxy - 22 - oxazolidinobisnor - 5,20(22) - choladiene (I), (7) 3β - isopropoxy - 5 - pregnen - 20 - one (II) from 3β - isopropoxy - 22 - N - methylbenzylaminobisnor - 5,-20(22)-choladiene (I), (8) the dimethyl maleate adduct of 5,7-pregnadien-20-one (II) from the dimethyl maleate adduct of 22-dibenzylaminobisnor-5,7,20(22)-cholatriene (I), (9) the maleic anhydride adduct of 3β-acetoxy-5,7-pregnadiene-3,20-dione (II) from the maleic anhydride adduct of 3β - acetoxy - 22 - diethanolaminobisnor - 5,-7,20(22) - cholatriene (I),

(10) the maleic anhydride adduct of 5,7-pregnadien-3,20-dione (II) from the maleic anhydride adduct of 3 - keto - 22 - morpholinobisnor - 5,7,20(22) - cholatriene (I),

(11) the dimethyl maleate adduct of 3β-propionoxy-5,7,9-pregnatrien-20-one (II) from the dimethyl maleate adduct of 3β - propionoxy - 5,7,9,20(22) - cholatetraene (I),

(12) the dimethyl maleate adduct of 3β-acetoxy-9,11-oxido-5,7-pregnadien-20-one (II) from the dimethyl maleate adduct of 3β - acetoxy - 9,11 - oxido - 22 - N - methylanilinobisnor-5,7,20(22)-cholatriene (I),

(13) 1,4 - pregnadiene - 3,20 - dione (II) from 22-(N - methylanilinyl) - 3 - ketobisnor - 1,4,20(22) - cholatriene (I),

(14) 4,6 - pregnadiene - 3,20 - dione (II) from 22-(N - 2 - methyl - pyrrolidinyl) - 3 - ketobisnor - 4,6,20-(22)-cholatriene (I),

(15) 4,7 - pregnadiene - 3,20 - dione (II) from 22-(N - oxazolidinyl) - 3 - ketobisnor - 4,7,20(22) - cholatriene (I),

(16) 4α - methyl - 4 - pregnene - 3,20 - dione (II) from 22 - (N - dibenzyl - aminyl) - 3 - ketobisnor - 4α-methyl - 4,20(22) - choladiene (I),

(17) 2α,6α - dimethyl - 4 - pregnene - 3,20 - dione (II) from 22 - (N - pyrrolidinyl) - 3 - ketobisnor - 2α,6α - dimethyl - 4,20(22) - choladiene (I),

(18) 7α - methyl - 4 - pregnene - 3,20 - dione (II) from 22 - (N - dibenzyl - aminyl) - 3 - ketobisnor - 7α-methyl - 4,20(22) - choladiene (I),

(19) 3β,11α - dihydroxy - pregnan - 20 - one (II) from 22 - (N - dicyclohexylaminyl) - 3β, 11α - dihydroxy - bisnor - 20(22) - cholene (I),

(20) 3 - propylenedioxy - 6α - chloro - 11β - hydroxypregnan - 20 - one (II) from 22 - (N-piperidinyl) - 3-propylenedioxy - 6α - chloro - 11β - hydroxy - bisnor - 20-(22)-cholene (I),

(21) 3 - ethylenedioxy - 5α,11β - dihydroxy - 6β-fluoro - pregnan - 20 - one (II) from 22 - (N - dioctylaminyl) - ethylenedioxy - 5α,11β - dihydroxy - 6β - fluorobisnor - 20(22) - cholene (I),

(22) 9α - fluoro - 11β - hydroxy - 4 - pregnene - 3,20-dione (II) from 22 - (N - tetrahydroquinolinyl) - 3-ketobisnor - 9α - fluoro - 11β - hydroxy - 4,20(22) - choladiene (I),

(23) 9α,11β - dichloro - 1,4 - pregnadiene - 3,20 - dione (II) from 22 - (N - anisidinyl) - 3 - ketobisnor - 9α,11β-dichloro - 1,4,20(22)-cholatriene (I),

(24) 11β - hydroxy - 1,4,6 - pregnatriene - 3,20 - dione (II) from 22 - (N - morpholinyl) - 3 - ketobisnor - 11β-hydroxy - 1,4,6,20(22) - cholatetraene (I),

(25) 6α - methyl - 9α - fluoro - 11β - hydroxy - 1,4-pregnadiene - 3,20 - dione (II) from 22 - diethanolaminobisnor - 6α - methyl - 9α - fluoro - 11β - hydroxy-1,4,20(22) - cholatriene (I).

(26) 3α,11α - diacetoxy - pregnan - 20 - one (II) from 22 - dicyclo - heptylaminobisnor - 3α,11α - diacetoxy-20(22) - cholene (I),

(27) 3β,11β - dihydroxy - 5 - pregnen - 20 - one (II) from 22 - (2 - methylpyrrolidinyl) - 3β,11β - dihydroxy-5,20(22) - choladiene (I),

(28) 3β - acetoxy - 9(11) - pregnen - 20 - one (II) from 22 - (N - methylanisidinyl) - 3β - acetoxy - 9(11),-20(22) - choladiene (I),

(29) 3 - (2′,2′ - dimethylpropylidenedioxy) - 6β - methyl - 5α,11β - dihydroxy - pregnan - 20 - one (II) from 22 - (N - morpholinyl) - 3 - (2′,2′ - dimethylpropylidenedioxy) - 6β - methyl - 5α,11β - dihydroxy - 20(22) - cholene (I) and

(30) 3α - naphthoxy - 11α - hydroxy - pregnan - 20-one (II) from 22(N - piperidinyl) - 3α - naphthoxy-11α - hydroxy - 20(22) - cholene (I).

I claim:
1. A process for production of a 20-ketosteroid which comprises: subjecting a corresponding steroid 22-enamine to photosensitized oxygenation.

2. A process in accordance with claim 1 wherein the starting material is a 22-enamine of 3-ketobisnor-4-cholen-22-al and the product is 4-pregnene-3,20-dione.

3. A process in accordance with claim 1 wherein the starting material is a 22-enamine of 3-ketobisnor-1,4-choladien-22-al and the product is 1,4-pregnadien-3,20-dione.

4. A process in accordance with claim 1 wherein the starting material is a 22-enamine of 3-ketobisnor-4,6-choladien-22-al and the product is 4,6-pregnadien-3,20-dione.

5. A process in accordance with claim 1 wherein the starting material is a 22-enamine of 3-ketobisnor-4,7-choladien-22-al and the product is 4,7-pregnadien-3,20-dione.

6. A process in accordance with claim 1 wherein the starting material is 22-(N-morpholinyl)-bisnor-4,20(22)-choladien-3-one and the product is 4-pregnene-3,20-dione.

References Cited
UNITED STATES PATENTS

| | | | |
|---|---|---|---|
| 3,038,909 | 6/1962 | Kerwin | 204—158 X |
| 3,352,920 | 11/1967 | Meinwald | 204—158 X |

HOWARD S. WILLIAMS, Primary Examiner